(No Model.)

P. W. POWER.
PILLOW BLOCK FOR DYNAMO ELECTRIC MACHINES AND MEANS FOR SUPPORTING SAME.

No. 559,538. Patented May 5, 1896.

WITNESSES:
Frank S. Ober
H. M. Skinner

INVENTOR
Pomeroy W. Power.
BY H. B. Brownell.
ATTORNEY

ANDREW B.GRAHAM, PHOTO-LITHO, WASHINGTON, D.C.

UNITED STATES PATENT OFFICE.

POMEROY W. POWER, OF PITTSFIELD, MASSACHUSETTS, ASSIGNOR TO THE STANLEY ELECTRIC MANUFACTURING COMPANY, OF SAME PLACE.

PILLOW-BLOCK FOR DYNAMO-ELECTRIC MACHINES AND MEANS FOR SUPPORTING SAME.

SPECIFICATION forming part of Letters Patent No. 559,538, dated May 5, 1896.

Application filed February 19, 1896. Serial No. 579,979. (No model.)

*To all whom it may concern:*

Be it known that I, POMEROY W. POWER, a citizen of the United States, residing at Pittsfield, county of Berkshire, and State of Massachusetts, have invented certain new and useful Improvements in Pillow-Blocks and Means for Supporting the Same, of which the following is a specification.

My invention relates to pillow-blocks for supporting bearings for rotating shafts and the means for applying them, and has for its object to provide such blocks where it is of advantage to support them directly from the machine and to do it in such a manner that they shall not interfere with the access to and inspection and cleaning of the machine and so that there shall be no danger of straining the machine; also, to make a block supported in a simple and easily-applied manner which is yet very accurate. The bearing proper, which is supported by the pillow-block, forms no part of the present invention, and may be a plain bearing, a ball-bearing, or any other kind that may be preferred.

The class of machines to which my invention is particularly applicable, and to a machine of which class I have applied it, comprises those in which there is a stationary armature consisting of two laminated ring-form portions connected by a magnetic bridge of steel or iron bars, one or both of said ring-form portions carrying a circle or crown of armature-coils. A machine of the class referred to is shown in the accompanying drawings, in which—

Figure 2:
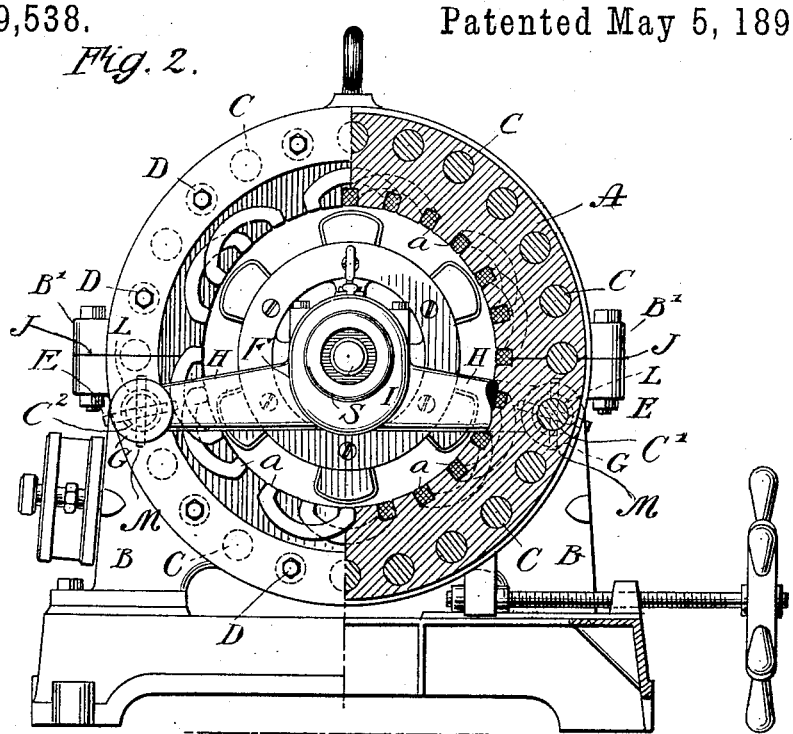
Figure 1:
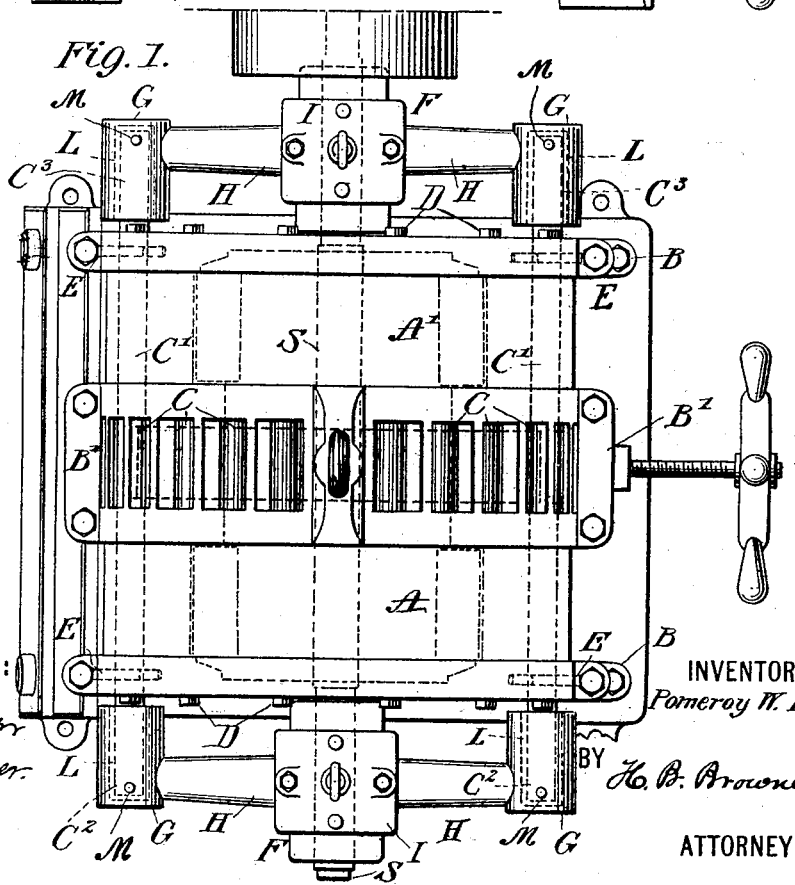

A and A are the laminated ring-form portions, one of which appears partly in section and partly in end elevation in Figure 2 and the outside of both of which appears in Fig. 1. These ring-formed portions carry the armature-coils $a$ $a$ and are themselves supported by the framework portions B B. These two ring-form parts, together with the framework portions, are connected together by bars C C, which pass through and are embedded in the ring-form portions. The outside parts of the framework B B are fastened to both the ends of some of these bars C C by bolts D D. These bars C C in such machines serve the double function of not only holding the parts together, but also—and this is a very important function—of forming a divided magnetic bridge for the magnetic flux, which in such machines passes from the inductor to either ring and then across to the other ring and back to the inductor.

The following is a description of my invention as applied to a machine such as that just referred to, further reference being had to the accompanying drawings, in which—

Fig. 1 is a plan view of a machine embodying my invention; and Fig. 2 is an end view, partly in elevation and partly in section.

As above stated, A A are laminated ring-form portions of a stationary armature. B B are parts of framework supporting the same.

$a$ $a$ are the armature-coils, and C C are massive iron bars passing through both of the laminated ring-form portions connecting the parts together.

C' C' are two massive iron bars, similar to the bars C C in that they pass through and are embedded in the ring-form portions A A. They differ, however, in that they are longer, so that their ends $C^2$ $C^2$ and $C^3$ $C^3$ extend beyond the parts B B of the framework. They are fastened securely in position by pins E E, which pass into the framework portions B B and into or through the bars C' C'. Upon each of the pairs of ends $C^2$ $C^2$ and $C^3$ $C^3$ of the bars C' C', protruding on either side, is placed a pillow-block casting F, which consists of two tubular or cup-shaped portions G G, connected by arms H H, which between them carry the portion I, within or upon which is placed any kind of a bearing for the shaft S that may be desired. Preferably these parts G G, H H, and I should be cast in one piece. The bars C' C' are preferably in the lower half of the armature. This permits the armature to be divided, as shown, on a plane cutting it at J J, so that the upper portion can be removed to give access to the interior of the machine without affecting the pillow-blocks or their supports.

The tubular or cup-shaped portions G G surround the pairs of ends $C^2$ $C^2$ and $C^3$ $C^3$ of the bars C' C' and have the internal diameter somewhat larger than the external diameter of the ends of the bars C' C', so as to leave an annular space. When the castings F F are placed in position, they are secured to the ends of the bars C' C' by lead or other similar soft metal L, which, in a molten condition, is poured into the annular space so as to fill it and also the spaces at the end of the bars. End motion of the casting on the bars C' C' is prevented by taper-pins M, which are passed through the casting and the bars.

It will be seen that by my invention the massive iron bridge-bars C' C' serve not only as a bridge for the magnetic flux, but also as a support for the pillow-blocks; also that the bearings, when supported by the opposite ends of the same bars, counterbalance each other directly without strain on any other portions of the frame; also that the filling of lead used causes a break in the magnetic circuit, which, if complete to the armature through the inductor-shaft and their pillow-blocks, would permit some leakage and consequent loss of magnetic force which otherwise would act upon the armature-coils; further, the tubular or cup-shaped portions being cored castings and the bars C' C' being preferably of cold-rolled steel, no machine-work is required on them to prepare them or in assembling them, except the drilling of holes for the taper-pins. The construction, on account of its rigidity and manner of assembling, is applicable to any machines where there may be suitable bars or projections, whatever may be their other functions.

What I claim as my invention, and desire to secure by Letters Patent, is—

1. In a machine having suitable projections, a pillow-block having tubular or cup-shaped portions fitted over said projections, and a filling of lead poured into the space between the projections and the interior of the cup-shaped portions, the parts being secured against relative movement, substantially as described.

2. In a dynamo-electric machine having a stationary armature, two bars extending through the machine so as to have ends protruding from each end of the machine, in combination with a pillow-block supported from said protruding ends, the parts being secured against longitudinal movement, substantially as described.

3. In a dynamo-electric machine having a stationary armature composed of two parts connected by a magnetic bridge consisting of a series of bars, two bars of the magnetic bridge extending through the machine and protruding at each end, in combination with two pillow-blocks supported by the ends protruding in the same direction, substantially as described.

4. In a dynamo-electric machine having a stationary armature composed of two parts connected by a magnetic bridge consisting of a series of bars, two bars of the magnetic bridge extending through the machine and protruding at each end, in combination with two pillow-blocks, each having tubular partitions surrounding one pair of said protruding ends, and a filling of soft metal poured into the spaces between the ends and the surrounding tubular portions, substantially as described.

In testimony whereof I have hereunto set my hand, at Pittsfield, Massachusetts, this 13th day of February, 1896.

POMEROY W. POWER.

Witnesses:
WILFRID K. HUNTER,
WINFIELD LANGDON.